Nov. 10, 1959  L. S. GREENMUN  2,911,720
LIMIT TRAVEL STOP FOR DENTURES
Filed Nov. 8, 1957  2 Sheets-Sheet 1

INVENTOR.
LEO S. GREENMUN
BY
Salvatore G. Militana,
ATTORNEY

Nov. 10, 1959 — L. S. GREENMUN — 2,911,720
LIMIT TRAVEL STOP FOR DENTURES
Filed Nov. 8, 1957 — 2 Sheets-Sheet 2

INVENTOR.
LEO S. GREENMUN
BY
Salvatore G. Militana
ATTORNEY

United States Patent Office 2,911,720
Patented Nov. 10, 1959

2,911,720

LIMIT TRAVEL STOP FOR DENTURES

Leo S. Greenmun, Vero Beach, Fla.

Application November 8, 1957, Serial No. 695,464

7 Claims. (Cl. 32—2)

This invention relates generally to artificial lower dentures, but is more particularly directed to limit travel stop devices for lower dentures constructed in accordance with my U.S. Patent No. 2,641,835 entitled Artificial Denture.

In my Patent No. 2,641,835, I show and describe a flexible lower denture designed and constructed to fit against the undercut surfaces of the mylohyroid ridges of a person's mouth and to compensate for displacement of the supporting tissues resulting from the flexing of the mandible during the time the person is biting and chewing. In particular the flexible lower denture which is split or cut between the two front teeth is provided with a spring imbedded in the material forming the denture to permit a person to compress the rear end portions of the denture for positioning the denture in one's mouth and removing same therefrom. It has been noted that persons using these dentures are prone to pressing the rear ends of the dentures with too much force especially when cleaning the dentures. As a result the spring in the dentures becomes over extended and lose their resiliency so that the two halves of the denture did not return to their outwardmost extended position, at which position the denture fitted properly and were now loose and ill-fitting.

Therefore, a principal object of the present invention is to provide a flexible denture with a limit travel stop means for preventing the flexing of the denture beyond a desired position.

A further object of the present invention is to provide a flexible denture with a limit travel stop which is imbedded in the material forming the denture.

A still further object of the present invention is the provision of a limit travel stop device for a flexible denture, which device is simple in construction and operation and which is readily mountable in the denture during the construction thereof without the necessity of deviating from the established manner of producing dentures.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a top plan view of a lower denture embodying the novel features of my invention.

Figures 2 and 3 are cross sectional views taken along the lines 2 and 3 respectively of Figure 1 and looking in the direction as indicated by the respective arrows.

Figure 1:
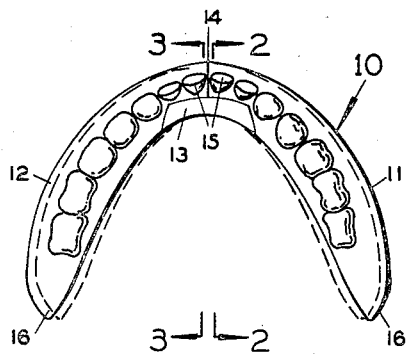
Figure 4:
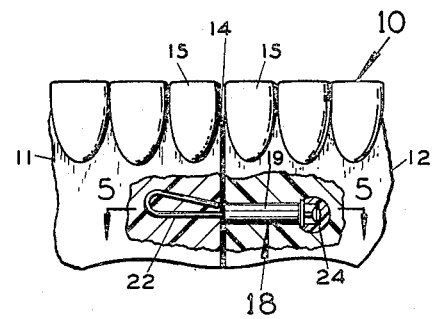
Figure 4 is an enlarged fragmentary view with a portion of the denture broken away to show my travel limit stop.
Figure 2:
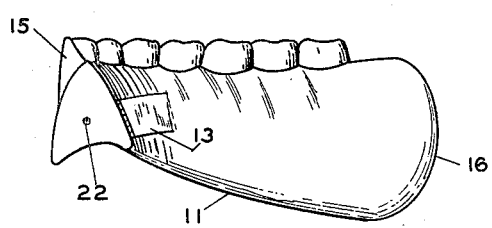
Figure 5:
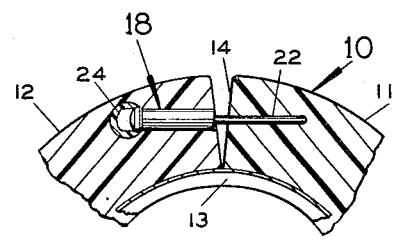
Figure 5 is a cross sectional view taken along the line 5—5 of Figure 4.
Figure 3:
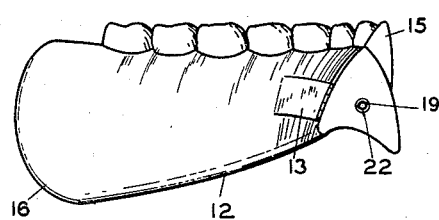
Figure 6:
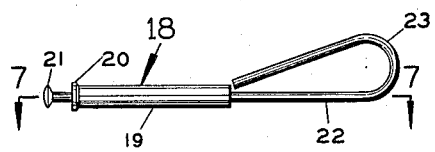
Figure 6 is an elevational view of my travel limit stop as seen removed from its position in the denture.
Figure 7:
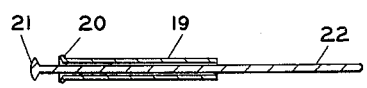
Figure 7 is a cross sectional view taken along the line 7—7 of Figure 6.
Figure 8:
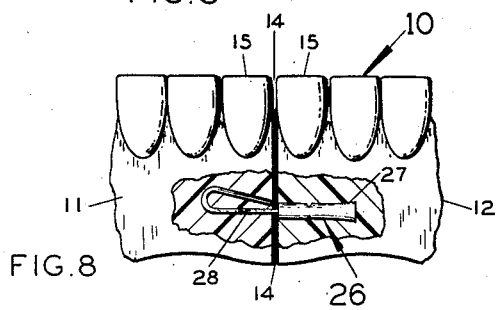
Figure 8 is a detailed view similar to Figure 4 showing a modified construction of my travel limit stop.
Figure 9:
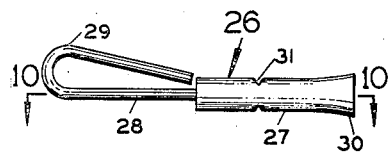
Figure 9 is an elevational view of my travel limit stop that is shown in Figure 8.
Figure 11:
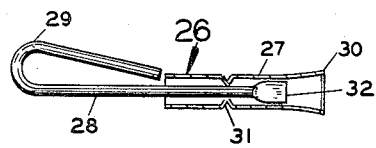
Figure 11 is a similar view taken along the line 11—11 of Figure 10.

Referring to the drawings wherein like numbers are used to designate similar parts throughout the several views and in particular to Figures 1–7 inclusive, the numeral 10 refers to a denture constructed in accordance with my Patent No. 2,641,835. In general, the denture 10 consists of molded base portions 11 and 12 connected together by a leaf or ribbon type spring 13 in the most part imbedded in the both halves 11 and 12. The denture 10 appears upon casual inspection identical with the conventional dentures, except for the cleft or cut 14 appearing between the base portions 11 and 12 at the position between the two front teeth 15, 15. By virtue of the construction set out in full detail in my above mentioned patent, the denture 10 may be flexed inwardly against spring pressure 13 to the dotted line position by applying pressure at the extreme rear portions 16, 16 of the base portions 11 and 12. With the base portions 11 and 12 flexed inwardly, the denture 10 may be readily inserted into position on the lower gums in one's mouth or just as readily removed therefrom, the primary function of this flexing action being to permit the insertion of the denture below the undercut the mylohyroid ridge of one's lower gums.

For obvious hygienic reasons the dentures 10, as all conventional false dentures must be removed from the mouth many times during the course of a day and vigorously cleaned. So, by flexing the denture 10 inwardly as described, the denture 10 is readily removed and replaced in the mouth.

However, it has been found that a person has the normal tendency to apply a greater force than is necessary at the retaining lip portions 16 to flex the base portions 11 and 12 to the dotted line position shown by Figure 1. As a result of this abuse, the effective and useful life of the denture 10 has been reduced unnecessarily. For example, continual over-flexing the base portions 11 and 12 will cause the spring 13 to lose some of its flexibility or spring action and take a set whereby the extreme end portions 16, 16 will not swing outwardly to their extreme position beneath the mylohyroid ridge of a person's gums and thereby fit loosely in the same manner as does the conventional lower dentures. Also, the cleft 14 which should normally appear as an almost imperceptible fine line or mark will now open into an aperture into which food particles, etc. may become lodged.

In order to prevent the flexing of the base portions 11 and 12 beyond the position found necessary and desirable for the proper manipulation of the denture 10, a limit travel stop device forming the present invention is incorporated in the denture 10 as described in detail hereinafter.

In the embodiment of the invention shown by Figures 1–7 inclusive a limit travel stop device 18 is shown embedded in the denture material forming the base portions 11 and 12 and extending across the cleft portion 14. It consists of a sleeve 19 positioned in the base portion 12 positioned beneath the front tooth 15 and extending from the cleft 14 to a position beneath an adjoining tooth 15. The inner end portion of the sleeve 19 is flared outward as at 20 to form a seat for a head 21 of a rod or pin 22 which is slidably positioned in the sleeve 19 and extending into the base portion 11. The pin 22 molded in the base portion 11 is returned on itself terminating adjacent the cleft 14 and forming an enlarged looped portion 23. The function of the looped portion 23 is to anchor the pin 22 in the base portion 11 and prevent any relative movement therebetween.

The procedure for making the denture 10 is set out in detail in my patent. At the time in the process of the manufacture of the denture 10 prior to the forming of the final mold, the limit travel stop device 18 along with all of the teeth, spring 13 and a separator sheet (not shown) are positioned in place. Then the final mold is made and when set, the wax is melted away to be replaced by acrylic resin or other plastic denture material. Prior to the resin being poured thereon, the head 21 of the pin 22 is invested in a small blob 24 of soft plastic material. Afther the denture 10 is completed the limit travel stop device 18 is entirely confined within the material of the base portions 11 and 12 except for that portion of the pin 22 which bridges the cleft 14 when the denture 10 has been flexed.

When pressure is applied on the rear end portions 16, 16 of the base portions 11 and 12 against the spring pressure 13, the denture will flex inwardly to the dotted line position shown by Figure 1. As this occurs the abutting ends of the base portions 11 and 12 which form the cleft 14, will swing away from each other at the forward portion of the denture 10, and the pin 22 will slide along the sleeve 19 until the head 21 comes to its seated position against the flared end 20 of the sleeve 19. Any further pressure being applied will be absorbed by the head 21 abutting against the flared seat 20 and the denture 10 cannot become further flexed. Upon release of the rear end portions 16 of base portions 11 and 12, the spring pressure 13 will restore the denture 10 to its outwardly extended position and the abutting edges of the base portions 11 and 12 will return to their contact position thereby closing the cleft 14. The pin 22 slides along the sleeve 19 in the reverse direction and the head 21 now moves away from the flared seat 20. The soft plastic 24 which envelops the head 21 permits the head 21 to move from its unseated to seated positions as shown and described. If the soft plastic 24 were not used then a cavity must be provided to permit the sliding movement of the head 21 in the inflexible plastic material of the base portions 11 and 12.

Figure 10:
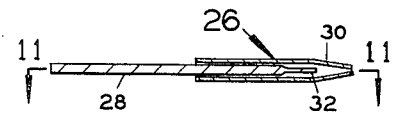
Figure 10 is a sectional view taken along the line 10—10 of Figure 9.

Referring now to Figures 8–12 inclusive there is shown a modification of my limit travel stop device 26 which does not require the use of a blob of soft plastic material 24 as shown by the device 18 previously described. The device 26 consists of an oval shaped sleeve 27 which was constructed from a tubular sleeve having the usual circular cross section which has been flattened slightly along two sides to provide the member with an oval shape as shown. The end 30 of the sleeve 27 is flattened completely to close off the end thereof as shown by Figure 10. A rod 28 which is slidably positioned in the sleeve 27 is bent upon itself to form a loop 29. The mid-portion of the sleeve 27 is crimped as at 31 to form a stop for the free end 32 of the rod 28 which has been hammered or flattened. By virtue of this structure the rod 28 may slide outwardly of the sleeve 27 until the end portion 32 of the rod 28 abuts against the crimped portion 31 of the sleeve 27.

The limit travel stop device 26 may be manufactured inexpensively by taking a straight piece of rod 28 and sliding it through the sleeve 27 which had previously been made oval in shape. The sleeve 27 is crimped as at 31 and the end of the rod is flattened as at 32. Now the end of the sleeve 27 is closed as at 30 and the loop 29 formed on the rod 28. The device 26 is positioned in the base portions 11 and 12 of the denture 10 in the same manner as that shown and described hereinabove.

Figure 12:
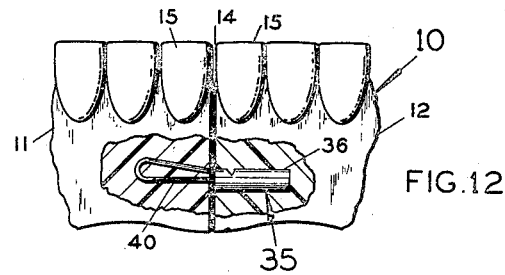
Figure 12 is a view similar to Figures 4 and 8 showing a further modified construction of my travel limit stop.
Figure 13:
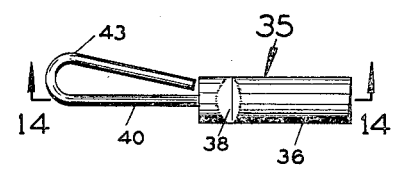
Figure 13 is an enlarged elevational view of my travel limit stop shown removed from its position in the denture.
Figure 14:
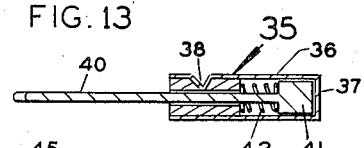
Figure 14 is a cross sectional view taken along the line 14—14 of Figure 13.

A further modified construction 35 of my limit travel stop device is shown by Figures 12 to 14 inclusive. The device 35 is an improvement of the other devices 18 and 26 in that a spring is provided to assist the spring 13 in returning the denture 10 to its normal outwardly flexed position. This device 35 consists of a tubular sleeve 36 whose end is closed as at 37 and at whose other end a plug is secured as by crimping at 38. The plug is provided with a centrally disposed bore through which a rod 40 extends. The inner end of the rod 40 is provided with an enlarged portion 41 which forms a shoulder or stop for a spring 42 which is received by the rod 40 and extends between the plug and the shoulder 41 thereby yieldingly forcing the rod 40 to its extreme inward position. The free end of the rod 40 is looped as at 43. The limit of travel of the rod 40 is approximately the distance spanned by the spring 42 between the shoulder 41 and the plug less the amount of space occupied by the spring 42 when completely compressed. This limit travel stop device 35 is mounted in the base portions 11 and 12 of the denture 10 in the same manner as the previously described devices 26 and 35 and also operates substantially identically thereto.

Figure 17:
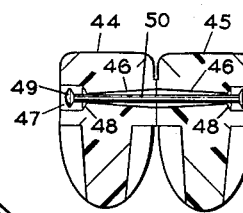
Figure 17 is a vertical cross sectional view taken of the two front teeth shown by the denture in Figure 15.
Figure 15:
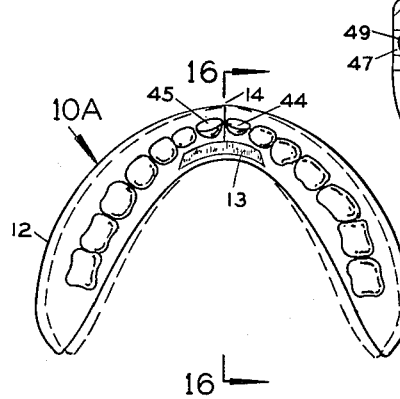
Figure 15 is a top plan view of a lower denture embodying a further modified construction of my travel limit stop.
Figure 16:
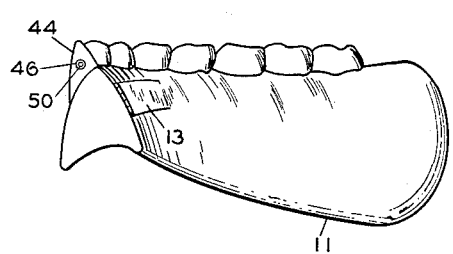
Figure 16 is a cross sectional view taken along the line 16—16 of Figure 15.

In the modified structure of my limit travel stop device shown by Figures 15–17 inclusive, there is shown the denture 10A of identically the same construction as that described hereinabove consisting of base portions 11 and 12 held in abutting relation by the imbedded spring 13. The denture 10A is provided with a full set of teeth as shown, with teeth 44 and 45 forming the front teeth, one mounted on base portion 11 and the other on base portion 12 in abutting relation with each other. Each of the teeth 44 and 45 is provided with an aligned bore 46 counter sunk on at their respective outer ends as at 47 to form a seat 48 for each of the heads 49 mounted at the ends of the rod 50. The rod 50 is somewhat longer than the distance of the seats 48 but shorter than the distance between the opposite side walls of the teeth 44 and 45. It is readily noted that the base portions 11 and 12 may be flexed to the dotted line position, the teeth 44 and 45 moving away from each other until the heads 49, 49 are seated against the seats 48, 48. When the denture 10A is released, the spring 13 will compel the base portions 11 and 12 to flex outwardly, and the ends thereof to come to their abutting relation with the cleft 14 becoming closed.

Figure 19:
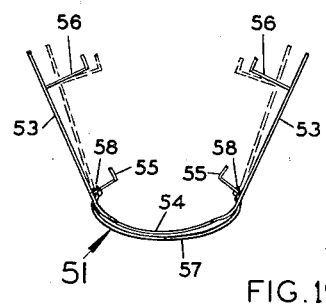
Figure 19 is a top plan view thereof.
Figure 18:
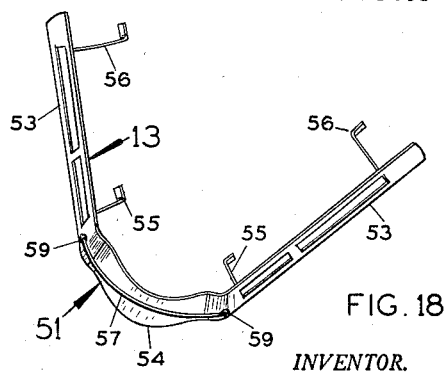
Figure 18 is a perspective view of the denture spring showing a further modified limit travel stop means.

The modification shown by Figures 18 and 19 of my travel limit stop device 51 is attached directly to the spring 13. The spring 13 is identical in construction to those shown in the other figures of the drawing and has not been described in detail since my travel limit stop devices heretofore described were not attached to nor formed a part of the devices. The spring 13 consists of a pair of arm portions 53 extending at an oblique angle joined at their inner ends to a curved portion 54. Extending inwardly of the arms 53 are a pair of ears 55 and 56 whose ends are bent at right angle. The function of the ears 55 and 56 is to firmly secure the spring 13 in the plastic material of the base portions 11 and 12. My limit travel stop device 51 consists of a wire member 57 which extends along the length of the curved portion 54, but not normally in contact therewith, with the ends 58 of the wire member 57 extending through bores 59 formed in the arms 53. The ends 58 of the wire member 57 are secured to the base of the ears 55 by coiling same thereabout or can be secured as by soldering or the like.

Now, after the spring 13 upon which is mounted the limit travel stop device 51, is positioned in my denture 10, the outer ends of the base portion 11 and 12 can be flexed inwardly until the spring member 57 comes into contact with the curved portion 54 of the spring 13. Since the arms 53 are encased in rigid plastic material, the curved portion 54 flexes about its mid-portion. Therefore, as the arms 53 are drawn together the curved portion 54 bends outwardly at its mid-portion until the wire member 57 comes into contact with the curved portion 54 and prevents the curved portion from bending any further, and when the arms 53 are released they will swing outwardly. The spring member 57 will then resume its normal position out of contact with the curved portion 54 of the denture spring 13.

Having described my invention, what I claim as new is:

1. An artificial denture comprising a pair of molded portions each having an end face portion in contact relation with each other at one end and a free end portion at the other end, a substantially U-shaped leaf spring mounted in said molded portions and extending across the juncture of said end face portions whereby said free end portions are yieldingly urged in a direction away from each other and limit travel means mounted in said molded portions and extending across said end face portions for limiting the swinging movement of said free end portions in a direction toward each other.

2. An artificial denture comprising a pair of molded portions having substantially a U-shape, said molded portions each having an end face portion in contact relation with each other at one end and a free end portion at the other end, a substantially U-shaped leaf spring mounted in said molded portions and extending across the juncture of said end face portions whereby said free end portions are yieldingly urged in a direction away from each other, a sleeve mounted in one of said end face portions said sleeve having one end positioned adjacent said juncture of said end face portions, shoulder means mounted on said sleeve, a rod slidably mounted in said sleeve, said rod having one end secured in said other of said end face portions and stop means mounted on the other end of said rod for engaging said shoulder on said sleeve when said free end portions of said molded portions are forced in a direction toward each other.

3. The structure as recited by claim 1 wherein said limit travel means comprises a sleeve mounted in one face portion, a rod mounted in the other face portion and slidably mounted in said sleeve and interengaging means mounted on said rod and said sleeve for preventing the sliding movement of said rod in said sleeve beyond a desired position.

4. A limit travel stop device for artificial dentures comprising a sleeve having a seat at one end, a rod slidably mounted in said sleeve, a head portion mounted on one end of said rod adapted to engage said seat of said sleeve for limiting the sliding movement of said rod in said sleeve and a loop formed along the other end of said rod for securing said rod in said artificial denture.

5. A limit travel stop device for artificial dentures comprising a sleeve having an oval cross section, a rod slidably mounted in said sleeve and having an enlarged portion at one end, said sleeve being crimped intermediate its ends for engaging said enlarged end portion of said rod and a loop formed at the other end of said rod for securing said rod in said denture.

6. A device of the class described comprising a leaf spring having leg portions, an arcuate portion connected to said leg portions to form a substantially U-shape, said leg portions each having a bore and a lug extending in a direction toward each other, wire means extending along said arcuate portion out of contact with the surface of said arcuate portion, said wire means having end portions extending through said bores and secured to said lugs whereby upon the forcing of said leg portions in a direction toward each other said wire means moves into contact relation with said arcuate portion and limits the bending of said leaf spring at said arcuate portion.

7. An artificial denture comprising a pair of molded portions having substantially a U-shape, said molded portions each having an end face portion in contact relation with each other at one end and a free end portion at the other end, a substantially U-shaped leaf spring mounted in said molded portions and extending across the juncture of said end face portions whereby said free end portions are yieldingly urged in a direction away from each other, a tooth mounted on each of said molded portions at said end face portions, said teeth having an aligned bore, shoulder means in said bore, a rod slidably mounted in said bores of said teeth and a head secured at each end of said rod adapted to engage said shoulders and limit the movement of said teeth in a direction away from each other when said free end portions of said molded portions are forced in a direction toward each other.

References Cited in the file of this patent

UNITED STATES PATENTS

| | | |
|---|---|---|
| 628,916 | Bitner | July 18, 1899 |
| 2,266,478 | Snell | Dec. 16, 1941 |